(12) United States Patent
Ishikawa et al.

(10) Patent No.: US 10,424,996 B2
(45) Date of Patent: Sep. 24, 2019

(54) MOTOR ROTOR, MOTOR USING THIS AND ELECTRIC COMPRESSOR

(71) Applicant: MITSUBISHI HEAVY INDUSTRIES THERMAL SYSTEMS, LTD., Minato-ku, Tokyo (JP)

(72) Inventors: Masayuki Ishikawa, Tokyo (JP); Goshi Iketaka, Tokyo (JP); Yuki Ichise, Tokyo (JP); Akinori Yoshioka, Aichi (JP)

(73) Assignee: MITSUBISHI HEAVY INDUSTRIES THERMAL SYSTEMS, LTD., Minato-Ku, Tokyo (JP)

(\*) Notice: Subject to any disclaimer, the term of this patent is extended or adjusted under 35 U.S.C. 154(b) by 196 days.

(21) Appl. No.: 15/507,023

(22) PCT Filed: Oct. 27, 2015

(86) PCT No.: PCT/JP2015/080210
§ 371 (c)(1),
(2) Date: Feb. 27, 2017

(87) PCT Pub. No.: WO2016/068119
PCT Pub. Date: May 6, 2016

(65) Prior Publication Data
US 2017/0279341 A1    Sep. 28, 2017

(30) Foreign Application Priority Data

Oct. 30, 2014   (JP) .................................. 2014-221581

(51) Int. Cl.
*H02K 15/02* (2006.01)
*H02K 15/16* (2006.01)
(Continued)

(52) U.S. Cl.
CPC ............. *H02K 15/16* (2013.01); *F04B 35/04* (2013.01); *F04B 39/00* (2013.01);
(Continued)

(58) Field of Classification Search
CPC .......... H02K 15/16; H02K 7/04; H02K 15/03; H02K 15/02; H02K 15/165; H02K 1/16;
(Continued)

(56) References Cited

U.S. PATENT DOCUMENTS

2002/0051715 A1    5/2002   Matsumoto et al.

FOREIGN PATENT DOCUMENTS

JP    2000-116080 A    4/2000
JP    2001-342954 A    12/2001
(Continued)

OTHER PUBLICATIONS

JP2009124821A_Original.*
JP2009124821A_Translated.*

*Primary Examiner* — Thiem D Phan
(74) *Attorney, Agent, or Firm* — Birch, Stewart, Kolasch & Birch, LLP

(57) ABSTRACT

Provided is a motor rotor which, without changing an integral fastening structure relying on swage pins, increases resistance to the excessive excitation force of the motor rotor and which can easily prevent decreases in fastening strength; a motor that uses the motor rotor, and an electric compressor are also provided. This motor rotor is provided with a cylindrical rotor core comprising multiple laminated magnetic steel sheets, end plates and balance weights laminated on both ends of the rotor core, and multiple headed swage pins which are inserted from one side and which integrally fasten the rotor core, the end plates and the balance weights. The material of the balance weight arranged to the head of the swage pin is harder than that of the swage pin, and the
(Continued)

material of the balance weight arranged to the swage part of the swage pin is softer than that of the swage pin.

6 Claims, 5 Drawing Sheets

(51) Int. Cl.
    *F04B 39/00*     (2006.01)
    *H02K 1/27*     (2006.01)
    *F04C 29/00*     (2006.01)
    *F04D 25/02*     (2006.01)
    *H02K 15/03*     (2006.01)
    *F04B 35/04*     (2006.01)
    *F04C 23/00*     (2006.01)
    *H02K 7/04*     (2006.01)
    *F04C 18/02*     (2006.01)

(52) U.S. Cl.
    CPC ........ *F04B 39/0044* (2013.01); *F04C 23/008* (2013.01); *F04C 29/0028* (2013.01); *F04C 29/0064* (2013.01); *F04C 29/0085* (2013.01); *F04D 25/026* (2013.01); *H02K 1/27* (2013.01); *H02K 7/04* (2013.01); *H02K 15/02* (2013.01); *H02K 15/03* (2013.01); *H02K 15/165* (2013.01); *F04C 18/0215* (2013.01); *F04C 2240/40* (2013.01); *H02K 1/276* (2013.01); *Y10T 29/49012* (2015.01)

(58) Field of Classification Search
    CPC .. H02K 1/26; H02K 1/28; F04B 35/04; F04B 39/0044; F04C 29/0064; F04C 29/0085; Y10T 29/49078; Y10T 29/49012
    USPC ................ 29/598, 596, 604, 609, 732, 738; 310/156.53; 123/2; 417/410.1
    See application file for complete search history.

(56) References Cited

FOREIGN PATENT DOCUMENTS

| | | | |
|---|---|---|---|
| JP | 2002-84694 A | | 3/2002 |
| JP | 2004-357430 A | | 12/2004 |
| JP | 2007-198335 A | | 8/2007 |
| JP | 2009-124821 A | | 6/2009 |
| JP | 2009124821 A | * | 6/2009 |
| JP | 2013-96272 A | | 5/2013 |

* cited by examiner

MOTOR ROTOR, MOTOR USING THIS AND ELECTRIC COMPRESSOR

TECHNICAL FIELD

The present invention relates to a motor rotor which has multiple magnetic steel sheets which are cylindrically laminated and integrally fasten the multiple magnetic steel sheets by swage pins, a motor using this, and an electric compressor.

BACKGROUND ART

In a rotor of a motor rotor used in an electric compressor, multiple magnetic steel sheets are cylindrically laminated so as to configure a rotor core, a magnet is embedded to the inside of the rotor core, end plates are laminated on both ends of the rotor core, balance weights are laminated on both end surfaces, and the rotor core, the end plates, and the balance weights are integrally fastened by multiple headed swage pins which are inserted from one side (for example, refer to PTLs 1 and 2).

In this motor rotor, in general, a ferrous base material is used as the material of the swage pin, and a brass material, a zinc material, a stainless material, or the like is used as the material of the end plate in order to prevent a leakage of magnetic flux. In addition, a brass material, a zinc material, a stainless material, or the like which is a metal having a high specific weight is used as the material of the balance weight. In addition, in order to integrally fasten multiple magnetic steel sheets including balance weights and the end plates, bolts shown in PTL 3 are used. However, economically, as shown in PTLs 1 and 2, the end plates and/or balance weights are integrally fastened simultaneously by the swage pins.

CITATION LIST

Patent Literature

[PTL 1] Japanese Unexamined Patent Application Publication No. 2000-116080
[PTL 2] Japanese Unexamined Patent Application Publication No. 2013-96272
[PTL 3] Japanese Unexamined Patent Application Publication No. 2007-198335

SUMMARY OF INVENTION

Technical Problem

In the motor rotor having the above-described configuration, in most cases, the ferrous base material is mainly used as the material of the swage pin, and a brass material is used as the materials of the balance weight and the end plate for the sake of the functions. However, the present inventors assumed an overload operation under an excitation condition in which an excessive load was applied to the motor rotor and performed an excitation test (excitation test in X, Y, and Z axial directions). As a result, the bearing surface of the balance weight which was laminated and disposed on the head side of the swage pin was depressed by setting due to the contact with the swage pin head, rattling occurred due to a decrease in fastening strength, and there was a concern that damages occurred.

Since it is considered that the above-described problems are similarly generated in the motor rotor in which the balance weights are not laminated and disposed on both ends of the motor rotor, and only the end plates formed of a brass material or the like which is softer than the material of the swage pin are laminated and disposed, measures are necessary in a motor to which the motor rotor having the above-described configuration is applied, and an electric compressor or the like having the motor.

The present invention is made in consideration of the above-described circumstance, and an object thereof is to provide a motor rotor in which a resistance with respect to an excessive excitation force of the motor rotor can be increased without changing an integral fastening structure formed by the swage pin and a decrease in fastening strength can be easily prevented, a motor using the motor rotor, and an electric compressor.

Solution to Problem

According to a first aspect of the present invention, there is provided motor rotor, including: a cylindrical rotor core which has multiple laminated magnetic steel sheets; end plates and balance weights which are laminated on both ends of the rotor core; and multiple headed swage pins which are inserted from one side and integrally fasten the rotor core, the end plates, and the balance weights, in which a material of the balance weight which is disposed on the head side of the swage pin is harder than a material of the swage pin, and the material of the balance weight which is disposed on the swage part side of the swage pin is softer than the material of the swage pin.

According to the first aspect of the present invention, in the motor rotor in which the end plates and the balance weights are laminated on both ends of the rotor core having the multiple laminated magnetic steel sheets, and the rotor core, the end plates, and the balance weights are integrally fastened by the multiple headed swage pins inserted from one side, the material of the balance weight which is disposed on the head side of the swage pin is harder than the material of the swage pin, and the material of the balance weight which is disposed on the swage part side of the swage pin is softer than the material of the swage pin. Accordingly, even in an excitation condition in which an excessive load is applied to the motor rotor, since the material of the bearing surface which is disposed and laminated on the head side of the swage pin side is harder than the material of the swage pin, depression in the balance weight due to contact with the swage pin head is not generated, and it is possible to maintain fastening strength. Since the material of the balance weight which is laminated and disposed on the swage part side of the swage pin is softer than the material of the swage pin, the swage piece of the swage pin is rigidly swaged to be bitten to the balance weight, and it is possible to improve fastening strength. Accordingly, since strength of fastening of the balance weight performed by the swage pin increases and a resistance with respect to an excessive excitation force is improved, it is possible to decrease risk of the fastening strength of the balance weight decreasing, rattling occurring, and damage occurring, and it is possible to enhance quality of the motor so as to secure reliability of the motor.

In the motor rotor of the first aspect of the present invention, in the motor rotor, the swage pin may be formed of a ferrous base material, the balance weight disposed on the head side of the swage pin may be formed of a stainless material, and the balance weight which is disposed on the swage part side of the swage pin may be formed of a brass material.

According to the first aspect of the present invention, since the swage pin is formed of a ferrous base material, the balance weight disposed on the head side of the swage pin is formed of a stainless material, and the balance weight which is disposed on the swage part side of the swage pin is formed of a brass material, it is possible to easily improve fastening strength of the balance weight by only selecting an appropriate material among materials which are known as the materials of the swage pin and the materials of the balance weight in the related art and appropriately combining the materials. Accordingly, it is possible to simply improve resistance with respect to an excitation force applied to the motor rotor at a low cost by only selecting an appropriate material without changing the fastening structure formed by the swage pin, and it is possible to increase reliability of the motor rotor.

According to a second of the present invention, there is provided a motor rotor including: a cylindrical rotor core which has multiple laminated magnetic steel sheets; end plates which are laminated on both ends of the rotor core; and multiple headed swage pins which are inserted from one side and integrally fasten the rotor core and the end plates, in which a material of the end plate which is disposed on the head side of the swage pin is harder than a material of the swage pin, and the material of the end plate which is disposed on the swage part side of the swage pin is softer than the material of the swage pin.

According to the second aspect of the present invention, in the motor rotor in which the end plates are laminated on both ends of the rotor core having the multiple laminated magnetic steel sheets, and the rotor core and the end plates are integrally fastened by the multiple headed swage pins inserted from one side, the material of the end plate which is disposed on the head side of the swage pin is harder than the material of the swage pin, and the material of the end plate which is disposed on the swage part side of the swage pin is softer than the material of the swage pin. Accordingly, even in an excitation condition in which an excessive load is applied to the motor rotor, since the material of the bearing surface of the end plate which is selected to prevent a leakage of magnetic flux and is disposed and laminated on the head side of the swage pin is harder than the material of the swage pin, depression in the end plate by setting due to contact with the swage pin head is not generated, and it is possible to maintain fastening strength. Since the material of the end plate which is laminated and disposed on the swage part side of the swage pin is softer than the material of the swage pin, the swage piece of the swage pin is rigidly swaged to be bitten to the end plate, and it is possible to improve fastening strength. Accordingly, since strength of fastening of the end plate performed by the swage pin increases and a resistance with respect to an excessive excitation force is improved, it is possible to decrease risk of the fastening strength of the end plate decreasing, rattling occurring, and damage occurring, and it is possible to enhance quality of the motor so as to secure reliability of the motor.

In the motor rotor according to the second aspect of the present invention, in the motor rotor, the swage pin may be formed of a ferrous base material, the end plate disposed on the head side of the swage pin may be formed of a stainless material, and the end plate which is disposed on the swage part side of the swage pin may be formed of any one of a brass material, a zinc material, or an aluminum based material.

According to the second aspect of the present invention, since the swage pin is formed of a ferrous base material, the end plate disposed on the head side of the swage pin is formed of a stainless material, and the end plate which is disposed on the swage part side of the swage pin is formed of any one of a brass material, a zinc material, and an aluminum based material, it is possible to easily improve fastening strength of the end plate by only selecting an appropriate material among materials which are known as the materials of the swage pin and the materials of the end plate in the related art and appropriately combining the materials. Accordingly, it is possible to simply improve resistance with respect to an excitation force applied to the motor rotor at a low cost by only selecting an appropriate material without changing the fastening structure formed by the swage pin, and it is possible to reliability of the motor rotor.

According to a third aspect of the present invention, there is provided a motor, including: a motor rotor; and a motor stator, in which the motor rotor is any one of the above-described motor rotors.

According to the motor of the third aspect of the present invention, since the motor rotor is any one of the above-described motor rotors, it is possible to improve fastening strength of the end plate and/or the balance weight which is laminated on both ends of the motor rotor and integrally fastened via the swage pin. Therefore, since a resistance with respect to an excitation force is increased under an excitation condition in which an excessive load is applied to the motor rotor, it is possible to decrease risk of the fastening strength of the end plate and/or the balance weight decreasing, rattling occurring, and damage occurring, and it is possible to enhance quality of the motor so as to secure reliability of the motor.

According to a fourth aspect of the present invention, there is provided an electric compressor, including: a compression mechanism; and a motor which drives the compression mechanism via a driving shaft, in which the motor is any one of above-described motors.

According to the electric compressor of the fourth aspect of the present invention, since the motor which drives the compression mechanism via the driving shaft is any one of the above-described motors, a resistance with respect to an excitation force is increased even under an excitation condition in which an excessive load is applied to the rotor of the motor which drives the compression mechanism, and it is possible to decrease risk of the fastening strength of the end plate and/or the balance weight decreasing, rattling occurring, and damage occurring. Accordingly, it is possible to further improve a vibration-proof performance at the time of the overload operation of the electric compressor so as to increase reliability of the electric compressor.

Advantageous Effects of Invention

According to the motor rotor of the present invention, even in an excitation condition in which an excessive load is applied to the motor rotor, since the material of the bearing surface of the balance weight which is disposed and laminated on the head side of the swage pin side is harder than the material of the swage pin, depression in the balance weight due to contact with the swage pin head is not generated, and it is possible to maintain fastening strength. Since the material of the balance weight which is laminated and disposed on the swage part side of the swage pin is softer than the material of the swage pin, the swage piece of the swage pin is rigidly swaged to be bitten to the balance weight, and it is possible to improve fastening strength. Accordingly, since strength of fastening of the balance weight performed by the swage pin increases and a resistance with respect to an excessive excitation force is improved, it is possible to decrease risk of the fastening strength of the balance weight decreasing, rattling occurring, and damage occurring, and it is possible to enhance quality of the motor so as to secure reliability of the motor.

According to the motor of the present invention, since it is possible to improve the fastening strength of the end plate and/or the balance weight which is laminated on both ends of the motor rotor and integrally fastened via the swage pin, since a resistance with respect to an excessive excitation force is increased under an excitation condition in which an excessive load is applied to the motor rotor, it is possible to decrease risk of the fastening strength of the end plate and/or the balance weight decreasing, rattling occurring, and damage occurring, and it is possible to enhance quality of the motor so as to secure reliability of the motor.

According to the electric compressor of the present invention, since a resistance with respect to an excitation force is increased and it is possible to decrease risk of the fastening strength of the end plate and/or the balance weight decreasing, rattling occurring, and damage occurring even under an excitation condition in which an excessive load is applied to the rotor of the motor which drives the compression mechanism, it is possible to further improve a vibration-proof performance at the time of the overload operation of the electric compressor so as to increase reliability of the electric compressor.

DESCRIPTION OF EMBODIMENTS

Hereinafter, embodiments according to the present invention will be described with reference to the drawings.

First Embodiment

Hereinafter, a first embodiment of the present invention will be described with reference to FIGS. 1, 2 and 4.

Figure 1:
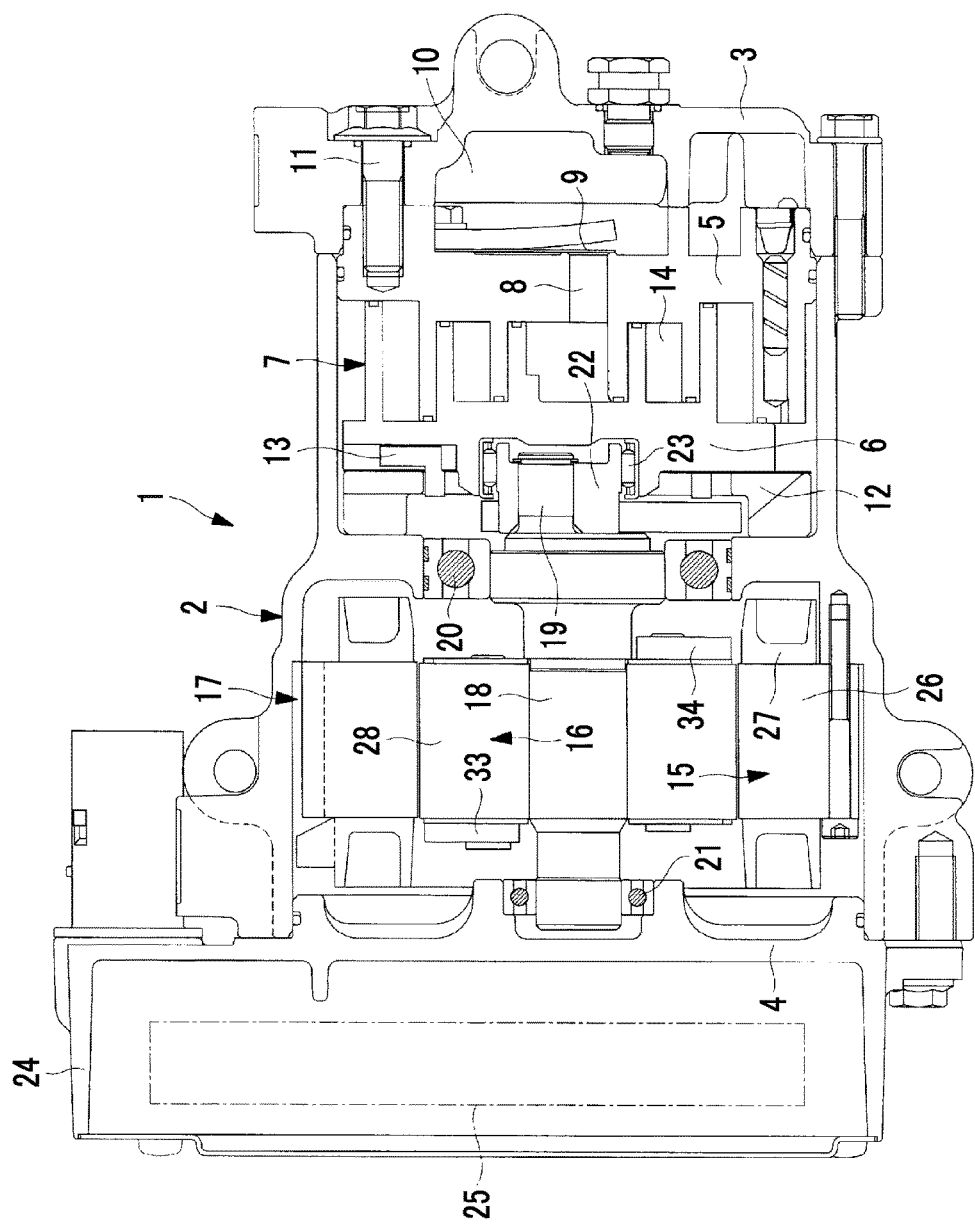
FIG. 1 is a sectional view of an electric compressor according to a first embodiment of the present invention.
Figure 2A:
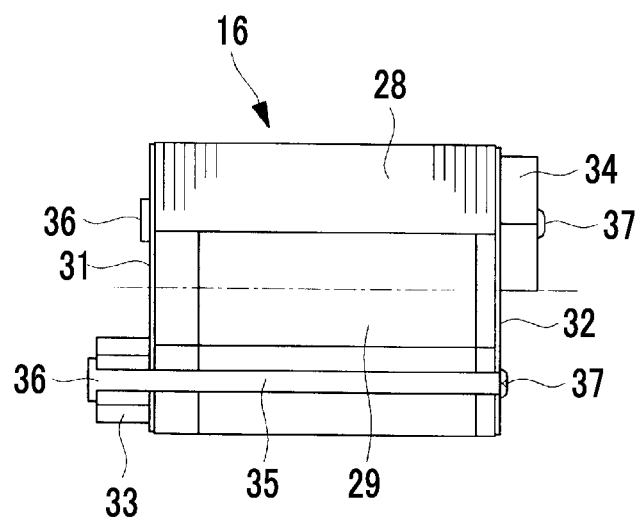
FIG. 2A is a sectional view of a motor rotor in the electric compressor.
Figure 2B:
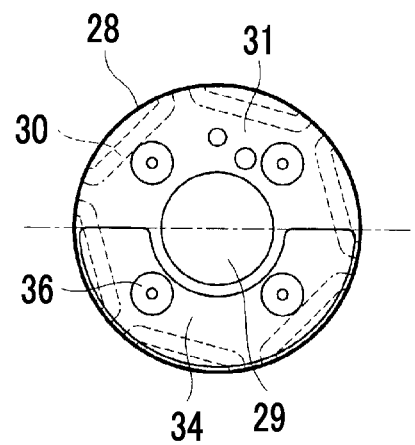
FIG. 2B is a lift side view of FIG. 2A.
Figure 2C:
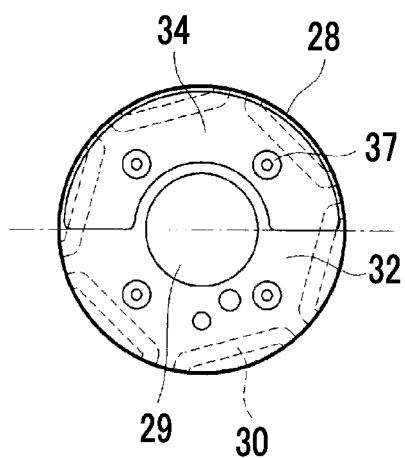
FIG. 2C is a right side view of FIG. 2A.
Figure 2D:
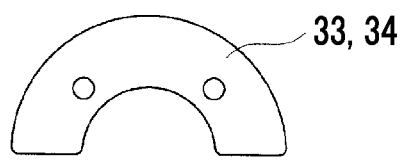
FIG. 2D is a side view of a balance weight.

FIG. 1 is a sectional view of an electric compressor according to a first embodiment of the present invention, FIG. 2A is a sectional view of the motor rotor, FIGS. 2B and 2C are left and right side views, and FIG. 2D is a side view of a balance weight.

Here, the electric compressor 1 is an inverter integrated electric compressor 1 in which an inverter 25 driving a motor 17 is integrally incorporated to a housing of the electric compressor 1. However, the present invention can be similarly applied to the electric compressor 1 in which the inverter 25 is not provided, or the inverter 25 is separately installed.

The inverter integrated electric compressor 1 includes a tubular housing 2, one end side of the housing 2 is sealed by a compressor-side end housing 3, and the other end side of the housing 2 is sealed by a motor-side end housing 4. A known scroll compression mechanism (compression mechanism) 7 configured of a pair of fixed scroll 5 and turning scroll 6 is incorporated into one end side of the tubular housing 2, and a high-pressure refrigerant gas which is compressed by the compression mechanism 7 is ejected into an ejection chamber 10 via an ejection port 8 and an ejection valve 9 and is ejected to the outside therefrom.

In addition, the fixed scroll 5 configuring the scroll compression mechanism 7 is fixed to the compressor-side end housing 3 by a bolt 11, and the turning scroll 6 is swingably supported by a thrust bearing 12 via rotation blocking means such as an Oldham link 13. The pair of fixed scroll 5 and turning scroll 6 engage with each other as well known so as to form a compression chamber 14, the compression chamber 14 is moved by revolution turning driving of the turning scroll 6 while the volume of the compression chamber 14 is decreased from the outer circumferential side to the center side so as to perform the compression operation.

A motor 17 configured of a motor stator (stator) 15 and a motor rotor (rotor) 16 is incorporated into the other end side of the tubular housing 2, and a driving shaft 18 is integrally connected to the motor rotor 16 of the motor 17. The driving shaft 18 is rotatably supported by a bearing 20 which is installed around the center inside the housing 2 and a bearing 21 which is provided in the inner surface of the motor-side end housing 4, a crank pin 19 provided on one end of the driving shaft 18 is connected to the turning scroll 6 via a drive bush 22 and a turning bearing 23, and the turning scroll 6, that is, the scroll compression mechanism 7 can be driven.

Meanwhile, an inverter accommodation portion 24 is integrally formed on the outer surface side of the motor-side end housing 4, and the inverter 25 which drives the motor 17 is installed and accommodated inside the inverter accommodation portion 24. The inverter 25 converts DC power supplied from an external battery or the like into three-phase AC power having a desired frequency, the three-phase alternating power is applied to the motor 17 via a hermetic terminal (not shown) which penetrates the motor-side end housing 4, and the motor 17 is driven.

For example, the inverter 25 is configured of a power substrate on which a switching circuit having multiple power transistors such as IGBT which is a power semiconductor switching element is mounted, a control substrate on which a control communication circuit having an element which is operated at a low voltage such as a CPU which controls the switching circuit and others based on a control signal input from the outside is mounted, a smoothing capacitor which is configured of a filter circuit for removing noise, and an electric component such as a coil, and since the inverter 25 itself is well known, the detail descriptions are omitted.

As described above, the motor 17 which is driven via the inverter 25 is configured of the motor stator (stator) 15 and the motor rotor (rotor) 16. The motor stator (stator) 15 includes a stator core 26 which is configured by laminating a required number of magnetic steel sheets which are annularly punched, and winding coils (not shown) are collectively wound around tooth portions provided on the inner circumferential side of the stator core 26 via a front edge bobbin 27.

Meanwhile, as shown in FIGS. 2A to 2C, the motor rotor (rotor) 16 which is rotatably provided on the inner circumference of the motor stator 15 via a predetermined motor gap includes a tubular rotor core 28 which is configured by laminating a required number of thin punched magnetic steel sheets, and a through hole 29 which is fitted to the driving shaft 18 axially penetrates at the center portion of the rotor core 28. In the rotor core 28, magnetic embedded holes having the number corresponding to the number of motor poles are provided along the outer circumference portion of the rotor core 28 so as to surround the through hole 29, and a permanent magnet (hereinafter, simply referred to as a magnet) 30 is incorporated into each magnet embedded hole.

In addition, end plates 31 and 32 are laminated to both end surfaces of the rotor core 28 configured by laminating multiple magnetic steel sheets so as to prevent slipping out of the magnets 30 and prevent a leakage of magnetic flux, and balance weights 33 and 34 for balancing a rotating system are laminated on the outer surfaces of the end plates 31 and 32. The rotor core 28, the end plates 31 and 32, the balance weights 33 and 34 are integrally fastened via multiple (four in the present embodiment) headed swage pins (referred to as rivets) 35.

Figure 4A:
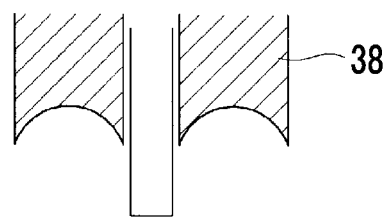
FIG. 4A is an explanatory view of an operation of caulking of a swage pin which fastens the motor rotor.
Figure 4A:
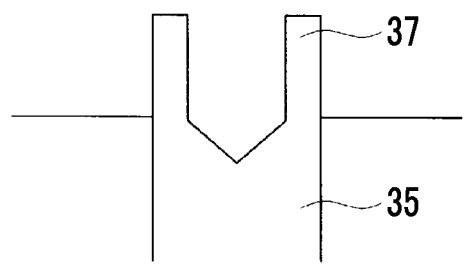
Figure 4B:
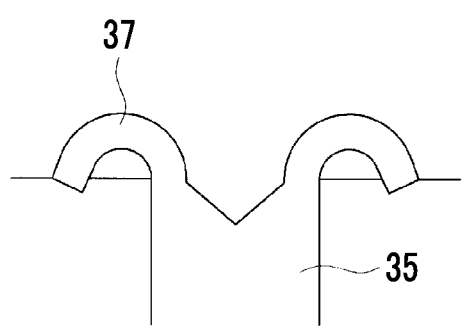
FIG. 4B is an explanatory view of the operation of caulking of the swage pin which fastens the motor rotor.

A head 36 is provided on one end of the headed swage pin 35, a swage part 37 is provided on the other end, and the headed swage pin 35 is inserted into through holes (not shown) provided in the rotor core 28, the end plates 31 and 32, and the balance weights 33 and 34 from one side, the swage part 37 is caulked by a swage tool 38 as shown in FIG. 4A, and the rotor core 28, the end plates 31 and 32, and the balance weights 33 and 34 are rigidly and integrally fastened.

As described above, in the present embodiment, even in a case where the motor rotor (rotor) 16, in which the rotor core 28, the end plates 31 and 32, and the balance weights 33 and 34 are integrally fastened via the head swage pins 35, is repeatedly operated under an excitation condition in which an excessive load is applied to the motor rotor 16 due to an overload operation or the like, in order to prevent fastening strength of the balance weights 33 and 34 fastened by the swage pins 35 from decreasing and prevent occurrence of rattling and damages, the following configuration is adopted.

As a result of an excitation test, as described above, it is found out that the reason why the fastening strength with respect to the balance weights 33 and 34 decreases is because the bearing surface of the balance weight 33 laminated and disposed on the head 36 side of the swage pin 35 is depressed by setting due to contact with the head 36 of the swage pin 35, the fastening strength decreases, and rattling occurs. It is considered that the above-described problems occur because a brass material which is a high specific weight metal is used as the materials of the balance weights 33 and 34 and the hardness of the brass material is lower than that of a ferrous base material which is mainly used as the material of the swage pin 35.

Accordingly, in the present embodiment, the material of the balance weight 33 which is disposed on the head 36 side of the swage pin 35 is set to be harder than the material of the swage pin 35, and the material of the balance weight 34 which is disposed on the swage part 37 side of the swage pin 35 is set to be softer than the material of the swage pin 35. Therefore, even when an excessive load is applied to the head 36 side of the swage pin 35, the bearing surface of the balance weight 33 is not depressed by the setting, and since the swage piece of the swage pin 35 is swaged so as to be bitten (refer to FIG. 4B) into the balance weight 34 formed of a soft material on the swage part 37 side of the swage pin 35, the fastening strength is not decreased by the swage pin 35.

That is, in general, for example, the swage pin 35 is formed of a ferrous base material such as cold heading carbon steel (JIS•G•3507-2), the end plates 31 and 32 are formed of a brass material, a zinc material, a stainless material, or the like so as to prevent a leakage of magnetic flux, and the balance weights 33 and 34 are formed of a brass material, a zinc material, a stainless material, or the like which has high specific weight metal. In the present embodiment, among the materials, the swage pin 35 is formed of a ferrous base material, the balance weight 33 disposed on the head 36 side of the swage pin 35 is formed of a stainless steel, the balance weight 34 disposed on the swage part 37 side of the swage pin 35 is formed of a brass material, and the hardness of the material configuring the swage pin 35 and the balance weights 33 and 34 is set to satisfy the above-described conditions.

According to the above-described configuration, the present embodiment exerts the following effects.

In the electric compressor 1, DC power supplied from an external power source is converted into three-phase AC power having a desired frequency by an inverter 25, the three-phase AC power is applied to the motor 17, the motor is rotationally driven, and the scroll compression mechanism 7 is driven. According to driving of the motor 17 and the scroll compression mechanism 7, a low-pressure refrigerant gas is sucked into the housing 2 from a refrigerating cycle side, and the low-pressure refrigerant gas flows to the scroll compression mechanism 7 side along the inner surface side of the housing 2 and is sucked into the scroll compression mechanism 7 so as to be compressed to a high-temperature and high-pressure gas. The high-pressure gas is ejected to the outside via the ejection chamber 10.

During this, power having a frequency suitable for the load is applied to the motor 17 via the inverter 25, and during a high load operation, an excessive load is applied to the motor rotor 16 and a large excitation force is applied to the motor rotor 16. Meanwhile, in the present embodiment, in the motor rotor 16 in which the rotor core 28 formed by laminating multiple magnetic steel sheets, the end plates 31 and 32, and the balance weights 33 and 34 are integrally fastened by multiple headed swage pins 35 which are inserted from one side, the material of the balance weight 33 disposed on the head 36 side of the swage pin 35 is harder than the material of the swage pin 35, and the material of the balance weight 34 disposed on the swage part 37 side of the swage pin 35 is softer than the material of the swage pin 35.

Accordingly, even in an excitation condition in which an excessive load is applied to the motor rotor 16, since the bearing surface of the balance weight 33 laminated and disposed on the head 36 side of the swage pin 35 is formed of a material which is harder than the material of the swage pin 35, depression in the balance weight due to contact with the swage pin head 36 is not generated, and it is possible to maintain fastening strength. Since the material of the balance weight 34 which is laminated and disposed on the swage part 37 side of the swage pin 35 is softer than the material of the swage pin 35, the swage piece of the swage pin 35 is rigidly swaged so as to be bitten into the balance weight 34, and it is possible to improve fastening strength.

Accordingly, it is possible to easily perform caulking of the swage pin 35, it is possible to increase fastening strength of the balance weights 33 and 34 fastened by the swage pins 35 to improve a resistance with respect to an excessive excitation force, it is possible to decrease risk of the fastening strength of the balance weights 33 and 34 decreasing, rattling occurring, and damage occurring, and it is possible to enhance quality of the motor 17 so as to secure reliability of the motor 17.

Specifically, since the swage pin 35 is formed of a ferrous base material, the balance weight 33 disposed on the head 36 side of the swage pin 35 is formed of a stainless material, and the balance weight 34 which is disposed on the swage part 37 side of the swage pin 35 is formed of a brass material, it is possible to easily improve fastening strength of the balance weights 33 and by only selecting an appropriate material among materials which are known as the materials of the swage pin 35 and the materials of the balance weights 33 and 34 and appropriately combining the materials.

Accordingly, it is possible to simply improve resistance with respect to an excitation force applied to the motor rotor 16 at a low cost by only appropriately selecting the materials configuring the swage pin 35 and the balance weights 33 and 34 without changing the fastening structure formed by the swage pin 35, and it is possible to increase reliability of the motor 17.

In the motor 17 according to the present embodiment, since the motor rotor 16 is the motor rotor 16 having the above-described configuration, it is possible to improve fastening strength of the balance weights 33 and 34 which are laminated on both ends of the motor rotor 16 and are integrally fastened by the swage pin 35. Accordingly, since a resistance with respect to an excessive excitation force is increased under an excitation condition in which an excessive load is applied to the motor rotor 16, it is possible to decrease risk of the fastening strength of the balance weights 33 and 34 decreasing, rattling occurring, and damage occurring, and it is possible to enhance quality of the motor 17 so as to secure reliability of the motor 17.

Similarly, in the electric compressor 1 according to the present embodiment, since the motor 17 which drives the compression mechanism 7 via the driving shaft 18 is the above-described motor 17, a resistance with respect to an excitation force is increased even under an excitation condition in which an excessive load is applied to the rotor 16 of the motor 17 which drives the compression mechanism 7, and it is possible to decrease risk of the fastening strength of the balance weights 33 and 34 decreasing, rattling occurring, and damage occurring. Accordingly, it is possible to further improve a vibration-proof performance at the time of the overload operation of the electric compressor 1 so as to increase reliability of the electric compressor 1.

Second Embodiment

Next, a second embodiment of the present invention will be described with reference to FIGS. 3 and 4.

The present embodiment is different from the above-described first embodiment in that the balance weights 33 and 34 are not provided in the motor rotor 16. Other matters are similar to those of the first embodiment, and descriptions thereof are omitted.

Figure 3A:
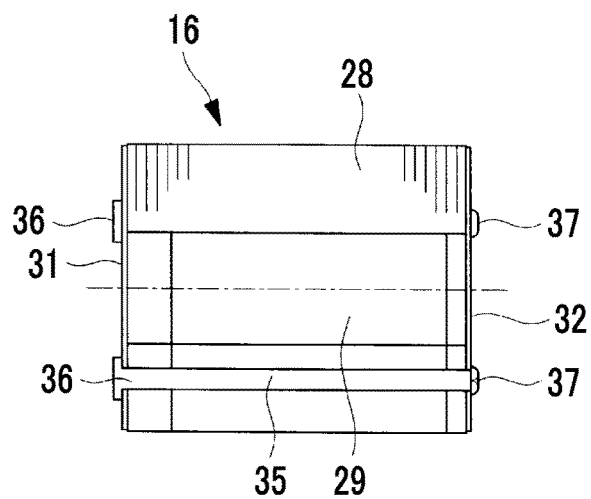
FIG. 3A is a sectional view of a motor rotor according to a second embodiment of the present invention.
Figure 3B:
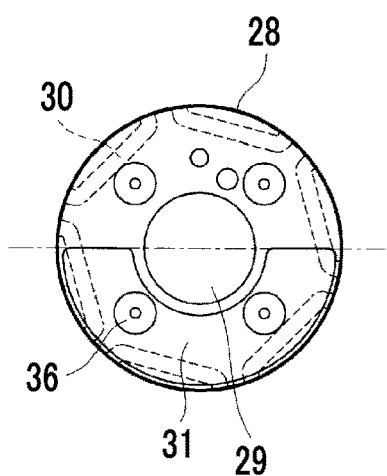
FIG. 3B is a left side view of FIG. 3A.
Figure 3C:
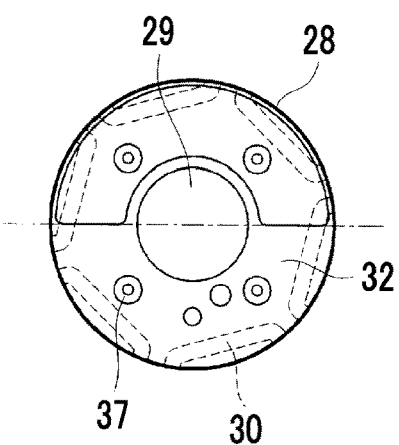
FIG. 3C is a right side view of FIG. 3A.

In the present embodiment, the balance weights are not provided in the motor rotor 16, and in this case, as shown in FIG. 3, in the motor rotor 16, the end plates 31 and 32 for preventing slipping out of the magnets 30 and the leakage of magnetic flux are laminated on both end surfaces of the rotor core 28 configured by laminating multiple magnetic steel sheets, and the rotor core 28 and the end plates 31 and 32 are integrally fastened by the swage pins 35.

In addition, in the present embodiment, in order to prevent the depression of the bearing surface of the end plate 31 disposed on the head 36 side of the swage pin 35 and the decrease in the fastening strength by the swage pin 35, the material of the end plate 31 disposed on the head 36 side of the swage pin 35 is harder than the material of the swage pin 35, and the material of the end plate 32 disposed on the swage part 37 side of the swage pin 35 is softer than the material of the swage pin 35. Accordingly, even when an excessive load is applied to the head 36 side of the swage pin 35, the bearing surface of the end plate 31 is not depressed by the setting, and since the swage piece of the swage pin 35 is swaged so as to be bitten (refer to FIG. 4B) into the end plate 32 formed of a soft material on the swage part 37 side of the swage pin 35, the fastening strength is not decreased by the swage pin 35.

Typically, the swage pin 35 is formed of a ferrous base material such as cold heading carbon steel (JIS•G•3507-2), and the end plates 31 and 32 are formed of a brass material, a zinc material, a stainless material, or the like so as to prevent a leakage of magnetic flux. Here, the swage pin 35 is formed of a ferrous base material, the end plate 31 disposed on the head 36 side of the swage pin 35 is formed of a stainless steel, the end plate 32 disposed on the swage part 37 side of the swage pin 35 is formed of any one of a brass material, a zinc material, and an aluminum based material, and the hardness of the material configuring the swage pin 35 and the end plates 31 and 32 is set to satisfy the above-described conditions.

In this way, in the case where the balance weights are not provided, the material of the end plate 31 disposed on the head 36 side of the swage pin 35 is harder than the material of the swage pin 35, and the material of the end plate 32 disposed on the swage part 37 side of the swage pin 35 is softer than the material of the swage pin 35. Accordingly, even in an excitation condition in which an excessive load is applied to the motor rotor 16, since the material of the bearing surface of the end plate 31 which is selected to prevent a leakage of magnetic flux and is disposed and laminated on the head 36 side of the swage pin 35 is harder than the material of the swage pin 35, depression in the end plate due to contact with the swage pin head 36 is not generated, and it is possible to maintain fastening strength.

Since the material of the end plate 32 which is laminated and disposed on the swage part 37 side of the swage pin 35 is softer than the material of the swage pin 35, the swage piece of the swage pin 35 is rigidly swaged so as to be bitten (refer to FIG. 4B) into the end plate 31, and it is possible to improve fastening strength.

Accordingly, since strength of fastening of the end plates 31 and 32 performed by the swage pin 35 increases and a resistance with respect to an excessive excitation force is improved, it is possible to decrease risk of the fastening strength of the end plates 31 and 32 decreasing, rattling occurring, and damage occurring, and it is possible to enhance quality of the motor 17 so as to secure reliability of the motor 17.

Specifically, the swage pin 35 is formed of a ferrous base material, the end plate 31 disposed on the head 36 side of the swage pin 35 is formed of a stainless material, and the end plate 32 disposed on the swage part 37 side of the swage pin 35 is formed of any one of a brass material, a zinc material, and an aluminum based material. Accordingly, it is possible to easily improve fastening strength of the end plates 31 and 32 by only selecting an appropriate material among materials which are known as the materials of the swage pin and the materials of the end plate and appropriately combining the materials. Therefore, it is possible to simply improve resistance with respect to an excitation force applied to the motor rotor 16 at a low cost by only selecting an appropriate material without changing the fastening structure formed by the swage pin 35, and it is possible to reliability of the motor rotor 16.

In addition, in the motor 17 to which the motor rotor 16 is applied and the electric compressor 1 in which the motor 17 is built, it is possible to increase the quality of the motor 17 so as to secure the reliability of the motor 17, and it is possible to further improve a vibration-proof performance at the time of the overload operation of the electric compressor 1 so as to increase reliability of the electric compressor 1.

In addition, the present invention is not limited to the above-described embodiments, and the present invention can be appropriately modified within the scope of the present invention. For example, in the above-described embodiments, specific some materials of the swage pin 35, the end plates 31 and 32, and the balance weights 33 and 34 are exemplified. However, the present invention is not limited to the materials, and the materials may be materials in addition to the exemplified materials as long as the materials satisfy the conditions regarding to hardness specified in claims 1 and 3.

In addition, the shapes, the dimensions, or the like of the end plates 31 and 32 or the balance weights 33 and 34 may not be particularly limited as long as the end plates 31 and 32 or the balance weights 33 and 34 satisfy respective functions. In addition, in the compression mechanism, the scroll compression mechanism 7 is described as an example. However, the present invention is not limited to this, and may be any compression mechanism. Similarly, the example in which the inverter accommodation portion 25 is provided in the motor-side end housing 4 is described. However, it is needless to say that the inverter accommodation portion 25 may be provided on the outer circumference of the compressor-side end housing 3 or the tubular housing 2.

REFERENCE SIGNS LIST

1: electric compressor
7: scroll compression mechanism (compression mechanism)
15: motor stator (stator)
16: motor rotor (rotor)
17: motor
18: driving shaft
28: rotor core
31, 32: end plate
33, 34: balance weight
35: swage pin (rivet)
36: head
37: swage part

The invention claimed is:

1. A motor rotor, comprising:
a cylindrical rotor core which has multiple laminated magnetic steel sheets;
a first end plate and a first balance weight which are laminated on one end of the rotor core;
a second end plate and a second balance weight which are laminated on the other end of the rotor core that is opposite to the one end of the rotor core; and
a first swage pin which integrally fastens the rotor core, the first end and second end plates, and the first balance weight, the first swage pin having a head which is provided on the one end side of the rotor core,
a second swage pin which integrally fastens the rotor core, the first and second end plates, and the second balance weight, the second swage pin having a head which is provided on the one end side of the rotor core,
wherein a material of the first balance weight which is disposed on the head side of the first swage pin is harder than a material of the swage pin, and
wherein material of the second balance weight which is disposed on the swage part side of the second swage pin is softer than the material of the second swage pin.

2. The motor rotor according to claim 1,
wherein the first swage pin and the second swage pin are formed of ferrous base materials, the first balance weight disposed on the head side of the first swage pin is formed of a stainless material, and the second balance weight which is disposed on the swage part side of the second swage pin is formed of a brass material.

3. A motor, comprising:
a motor rotor; and
a motor stator,
wherein the motor rotor is the motor rotor according to claim 2.

4. An electric compressor, comprising:
a compression mechanism; and
a motor which drives the compression mechanism via a driving shaft,
wherein the motor is the motor according to claim 3.

5. A z rotor, comprising:
a motor rotor; and
a motor stator,
wherein the motor rotor is the motor rotor according to claim 1.

6. An electric compressor, comprising:
a compression mechanism; and
a motor which drives the compression mechanism via a driving shaft,
wherein the motor is the motor according to claim 5.

* * * * *